(12) United States Patent
He et al.

(10) Patent No.: US 12,730,337 B2
(45) Date of Patent: Sep. 8, 2026

(54) WIDE AND NARROW VIEWING ANGLE-SWITCHABLE DISPLAY DEVICE AND CONTROL METHOD

(71) Applicant: INFOVISION OPTOELECTRONICS (KUNSHAN) CO., LTD., Suzhou (CN)

(72) Inventors: Jia He, Suzhou (CN); Chunyun Wu, Suzhou (CN)

(73) Assignee: INFOVISION OPTOELECTRONICS (KUNSHAN) CO., LTD., Suzhou (CN)

( * ) Notice: Subject to any disclaimer, the term of this patent is extended or adjusted under 35 U.S.C. 154(b) by 109 days.

(21) Appl. No.: 18/833,405

(22) PCT Filed: Aug. 25, 2022

(86) PCT No.: PCT/CN2022/114965
§ 371 (c)(1),
(2) Date: Jul. 26, 2024

(87) PCT Pub. No.: WO2024/040543
PCT Pub. Date: Feb. 29, 2024

(65) Prior Publication Data

US 2025/0172835 A1 May 29, 2025

(51) Int. Cl.
*G06F 3/01* (2006.01)
*G02F 1/13* (2006.01)

(52) U.S. Cl.
CPC ............ *G02F 1/1323* (2013.01); *G06F 3/011* (2013.01); *G06F 3/017* (2013.01)

(58) Field of Classification Search
CPC ............................... G06F 3/017; G06F 1/1323
See application file for complete search history.

(56) References Cited

U.S. PATENT DOCUMENTS

2016/0026253 A1* 1/2016 Bradski ................ H04N 13/128 345/8
2018/0122292 A1 5/2018 Ju
2021/0149511 A1 5/2021 Chung

FOREIGN PATENT DOCUMENTS

CN 102831856 A 12/2012
CN 105138173 A 12/2015
(Continued)

OTHER PUBLICATIONS

The First Office Action of CN patent application No. 202280003523.4 issued on Mar. 14, 2025.
(Continued)

*Primary Examiner* — Joseph L Williams
(74) *Attorney, Agent, or Firm* — Andrew C. Cheng

(57) ABSTRACT

A wide and narrow viewing angle-switchable display device and a control method are provided. The control method includes: acquiring action information of a user; comparing the action information with a stored action; and when the action information is matched with the stored action, sending a wide and narrow viewing angle switching signal, and controlling switching between wide and narrow viewing angle modes. The action information of the user is acquired and compared with the stored action, then the wide and narrow viewing angle switching signal is sent according to the comparison result, and the switching between the wide and narrow viewing angle modes is controlled; in this way, a sensor, such as an infrared sensor, an ultrasonic sensor, and an image sensor, can be directly arranged to acquire the action information of the user.

15 Claims, 8 Drawing Sheets wide viewing angle | wide viewing angle

(56) References Cited

FOREIGN PATENT DOCUMENTS

| | | | | | |
|---|---|---|---|---|---|
| CN | 105453106 A | | 3/2016 | | |
| CN | 106409209 A | | 2/2017 | | |
| CN | 107045387 A | | 8/2017 | | |
| CN | 206892487 U | | 1/2018 | | |
| CN | 212031884 U | | 11/2020 | | |
| CN | 112272256 A | * | 1/2021 | ........... | G06V 40/161 |

OTHER PUBLICATIONS

The First search report of CN patent application No. 202280003523.4 issued on Mar. 14, 2025.
International Search Report of PCT Patent Application No. PCT/CN2022/114965 issued on May 23, 2023.

* cited by examiner narrow viewing angle wide viewing angle

| narrow viewing angle | narrow viewing angle |
|---|---|

WIDE AND NARROW VIEWING ANGLE-SWITCHABLE DISPLAY DEVICE AND CONTROL METHOD

CROSS REFERENCE TO RELATED APPLICATIONS

This application is a 35 U.S.C. § 371 National Phase conversion of International (PCT) Patent Application No. PCT/CN2022/114965, filed on Aug. 25, 2022. The PCT International Patent Application was filed and published in Chinese.

TECHNICAL FIELD

The present invention relates to the technical field of display technology, and in particular, to a display device with switchable wide and narrow viewing angles and a control method therefor.

DESCRIPTION OF RELATED ART

With the continuous progress of LCD technology, the viewing angle of the display device has been widened from about 112° to more than 160°. While people enjoy the visual experience brought by wide viewing angle, they also hope to effectively protect business secrets and personal privacy, so as to avoid the commercial loss or embarrassment caused by the leakage of screen information. Therefore, in addition to the requirement of wide viewing angle, the display device is also required to have the function of switching between wide and narrow viewing angles in many occasions.

At present, the main way to switch between wide and narrow viewing angles is to attach a louver shielding film onto the display screen. When it is necessary to prevent peeping, the louver shielding film can be used to cover the screen to reduce the viewing angle. However, this method requires additional preparation of the louver shielding film, which will cause great inconvenience to users, and a louver shielding film can only achieve one viewing angle. Once the louver shielding film is attached, the viewing angle will be fixed in the narrow viewing angle mode. As a result, it is impossible to switch freely between the wide viewing angle mode and the narrow viewing angle mode, and the louver shielding film will reduce the brightness and the display effect.

The prior art also utilizes the viewing angle control electrode on one side of the color filter (CF) substrate to apply a vertical electric field to the liquid crystal molecules, causing the liquid crystal molecules to deflect in a vertical direction, thereby achieving a narrow viewing angle mode. By controlling the voltage applied on the viewing angle control electrode, it is thus possible to switch between the wide viewing angle mode and the narrow viewing angle mode.

In the prior art, although some display devices already have the function of switching between wide and narrow viewing angles, the switching between wide and narrow viewing angles requires manual pressing of a switching button, that is, an additional switching button is required to be set on the computer keyboard for controlling viewing angle switching. Due to the fact that existing keyboards use standard keyboards, such as the 104 keys standard keyboard and the 87 keys standard keyboard, if it is necessary to achieve switching between wide and narrow viewing angles, an additional switching button is required to be set in order to control the switching between wide and narrow viewing angles. This requires redefining the number of keys on the standard keyboard, remolding, and redesigning, resulting in a very high cost for achieving the switching between wide and narrow viewing angles. Alternatively, a function key may be used to control the switching between wide and narrow viewing angles, however, the switching through the function key requires modifying the computer system, causing significant inconvenience to the customer. Moreover, all the current 12 function keys have basically been reused, such as for adding or subtracting sound, adding or subtracting brightness, muting, refreshing, turning off the screen, etc. and there are no additional function keys available.

BRIEF SUMMARY OF THE INVENTION

Technical Problem

The existing wide and narrow viewing angle modes are also increasing, such as full-wide viewing angle mode, left-wide and right-narrow viewing angle mode, right-wide and left-narrow viewing angle mode, full-narrow viewing angle mode, etc. When there are many wide and narrow viewing angle modes, a reset button is further required to be set to facilitate users to quickly switch to the initial viewing angle mode and increase the user experience.

Therefore, whether it is setting additional switch buttons on the keyboard or using function keys as the switch buttons, it will increase significant trouble and cost.

Technical Solution

In order to overcome the shortcomings and deficiencies in the prior art, an object of the present invention is to provide a display device with switchable wide and narrow viewing angles and a control method therefor, to solve the problem of high cost by using keyboard to control the switching between wide and narrow viewing angles in the prior art.

The object of the present invention is achieved through the following technical solutions:

The present invention provides a control method for switching between wide and narrow viewing angles, the control method includes:

acquiring action information of a user, comparing the action information with a stored action;

when the action information is matched with the stored action, sending a wide and narrow viewing angle switching signal, and controlling switching between wide and narrow viewing angle modes.

Further, the action information is distance information, the stored action is a stored distance, the control method includes:

monitoring the distance information of an object from the display panel;

comparing the distance information with the stored distance;

when the distance information is less than the stored distance, sending a wide and narrow viewing angle switching signal, and controlling switching between wide and narrow viewing angle modes.

Further, the control method further includes:

monitoring a first duration at which the distance information is less than the stored distance;

when the first duration is greater than a first preset time, sending a wide and narrow viewing angle switching signal, and controlling switching between wide and narrow viewing angle modes.

Further, the control method includes:

after the distance information is detected to be less than the stored distance, and thereafter the distance information is detected to be greater than or equal to the stored distance, it is recorded as a triggering action and the wide and narrow viewing angle switching signal is sent.

Further, the action information is gesture information, the stored action is a gesture action, the control method includes:

acquiring the gesture information of the user;

comparing the gesture information with the gesture action;

when the gesture information is matched with the gesture action, sending a wide and narrow viewing angle switching signal, and controlling switching between wide and narrow viewing angle modes.

Further, in order for determining that the gesture information is matched with the gesture action, the similarity between the gesture information and the gesture action is required to be greater than 90%.

Further, the control method further includes:

monitoring a second duration of the gesture information;

when the second duration is greater than a second preset time, sending a wide and narrow viewing angle switching signal, and controlling switching between wide and narrow viewing angle modes.

Further, the action information is facial action information, the stored action is a facial action, the control method includes:

acquiring the facial action information of the user;

comparing the facial action information with the facial action;

when the facial action information is matched with the facial action, sending a wide and narrow viewing angle switching signal, and controlling switching between wide and narrow viewing angle modes.

Further, the control method further includes:

monitoring a third duration of the facial action information;

when the third duration is greater than a third preset time, sending a wide and narrow viewing angle switching signal, and controlling switching between wide and narrow viewing angle modes.

Further, the wide and narrow viewing angle switching signal is a cyclic switching signal, and the cyclic switching signal is used to control the wide and narrow viewing angle modes to be switched cyclically.

Further, the wide and narrow viewing angle switching signal is a reset switching signal, and the reset switching signal is used to control the wide and narrow viewing angle modes to be switched to an initial viewing angle mode.

The present invention further provides a display device with switchable wide and narrow viewing angles, wherein the display device is controlled by the control method. The display device includes a display panel capable of switching between wide and narrow viewing angles and a circuit board for controlling the display panel. An action sensor is provided on the display panel or/and the circuit board, and the action sensor is used to acquire the action information of the user.

Further, the display panel includes a display area and a non-display area located around the display area, and the action sensor is located on a glass substrate of the non-display area.

Further, a processor is provided on the circuit board. Both the action sensor and the display panel are electrically connected to the processor. The processor controls the display panel to switch between wide and narrow viewing angle modes based on the action information.

Further, the action sensor is an infrared sensor, an ultrasonic sensor, or an image sensor.

Beneficial Effects

By acquiring the action information of the user and comparing it with the stored action, and then sending a wide and narrow viewing angle switching signal based on the comparison result and controlling the switching between wide and narrow viewing angle modes, therefore, a sensor such as infrared sensor, ultrasonic sensor or image sensor can be directly set to acquire the action information of the user, thus eliminating the need to set additional viewing angle switching buttons on the keyboard or modify the system reuse function keys to control switching between wide and narrow viewing angle modes, to simplify keyboard design and reduce keyboard production costs.

DETAILED DESCRIPTION OF THE EMBODIMENTS

In order to further illustrate the technical solutions and effects of the present invention to achieve its intended purpose, the following describes the specific implementation mode, structures, features and effects of the wide and narrow viewing angle-switchable display device and control method provided by the present invention in combination with the accompanying drawings and preferred embodiments as follows.

First Embodiment

Figure 5:
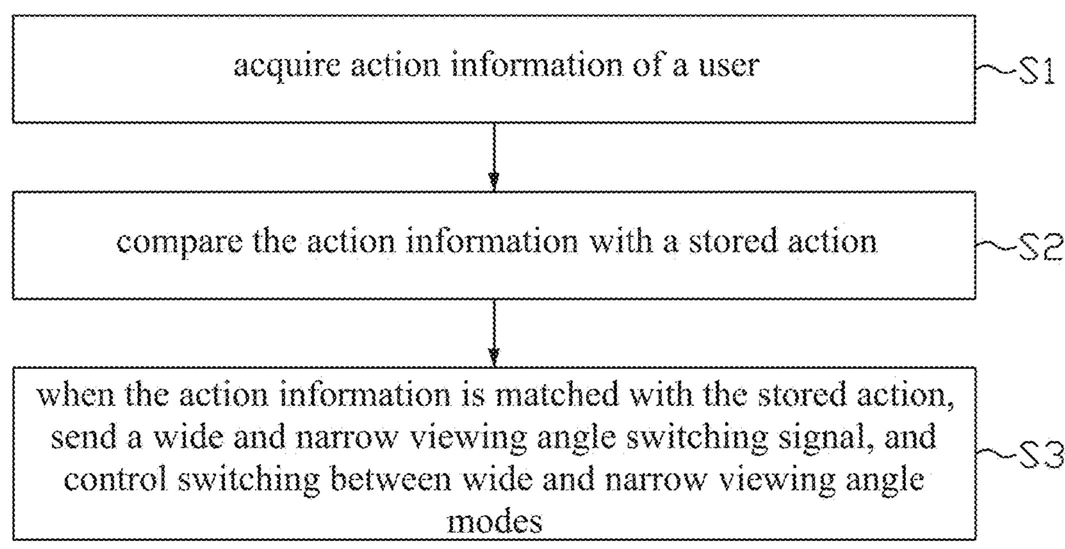
FIG. 5 is a flowchart of the control method in the first embodiment of the present invention.
Figure 6:
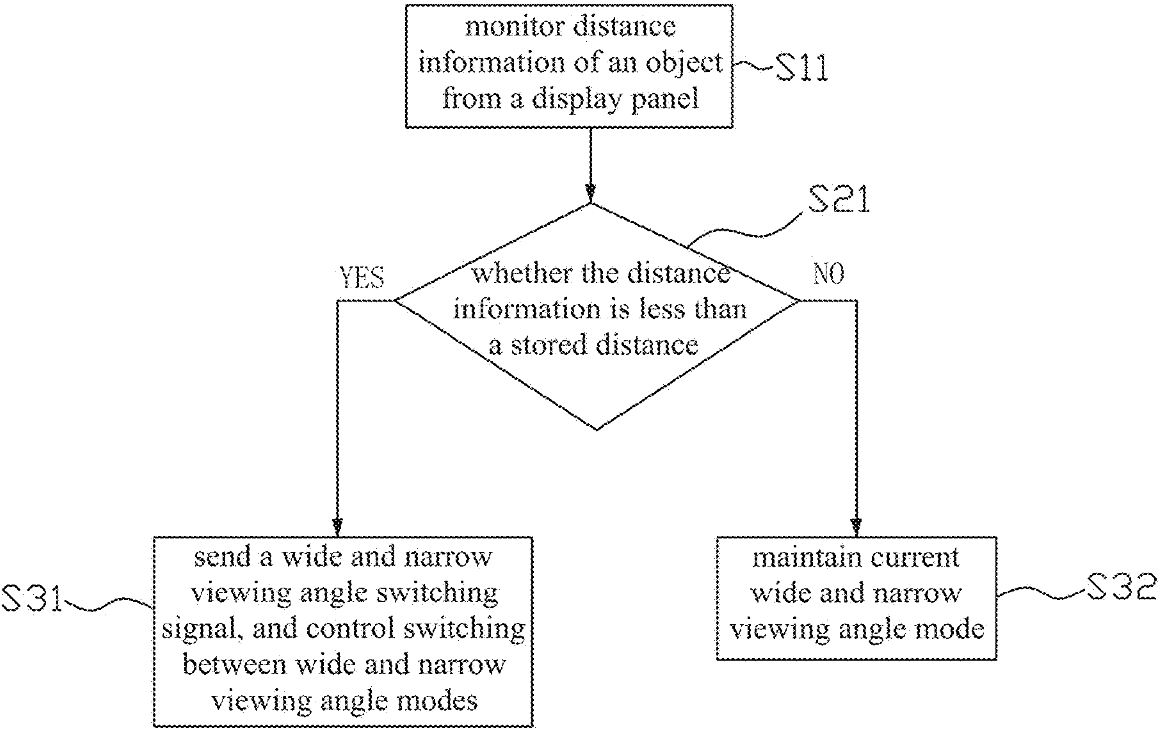
FIG. 6 is another flowchart of the control method in the first embodiment of the present invention.

FIG. 5 is a flowchart of the control method in the first embodiment of the present invention. FIG. 6 is another flowchart of the control method in the first embodiment of the present invention.

As shown in FIGS. 5 to 6, the first embodiment of the present invention provides a control method for switching between wide and narrow viewing angles. The control method includes:

Step S1: acquiring action information of a user.

Step S2: comparing the action information with a stored action.

Step S3: when the action information is matched with the stored action, sending a wide and narrow viewing angle switching signal, and controlling switching between wide and narrow viewing angle modes.

Of course, it can be understood that when the action information is not matched with the stored action, the system will not send a wide and narrow viewing angle switching signal and will maintain the current wide and narrow viewing angle mode.

Figure 14:
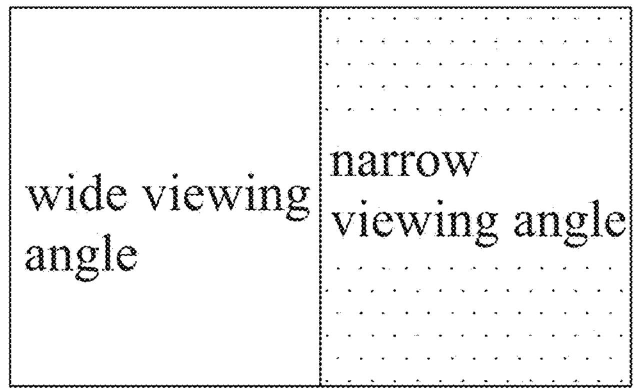
FIG. 14 is a schematic diagram of the planar structure of the display device in the third wide and narrow viewing angle mode of the present invention.
Figures 15, 16:
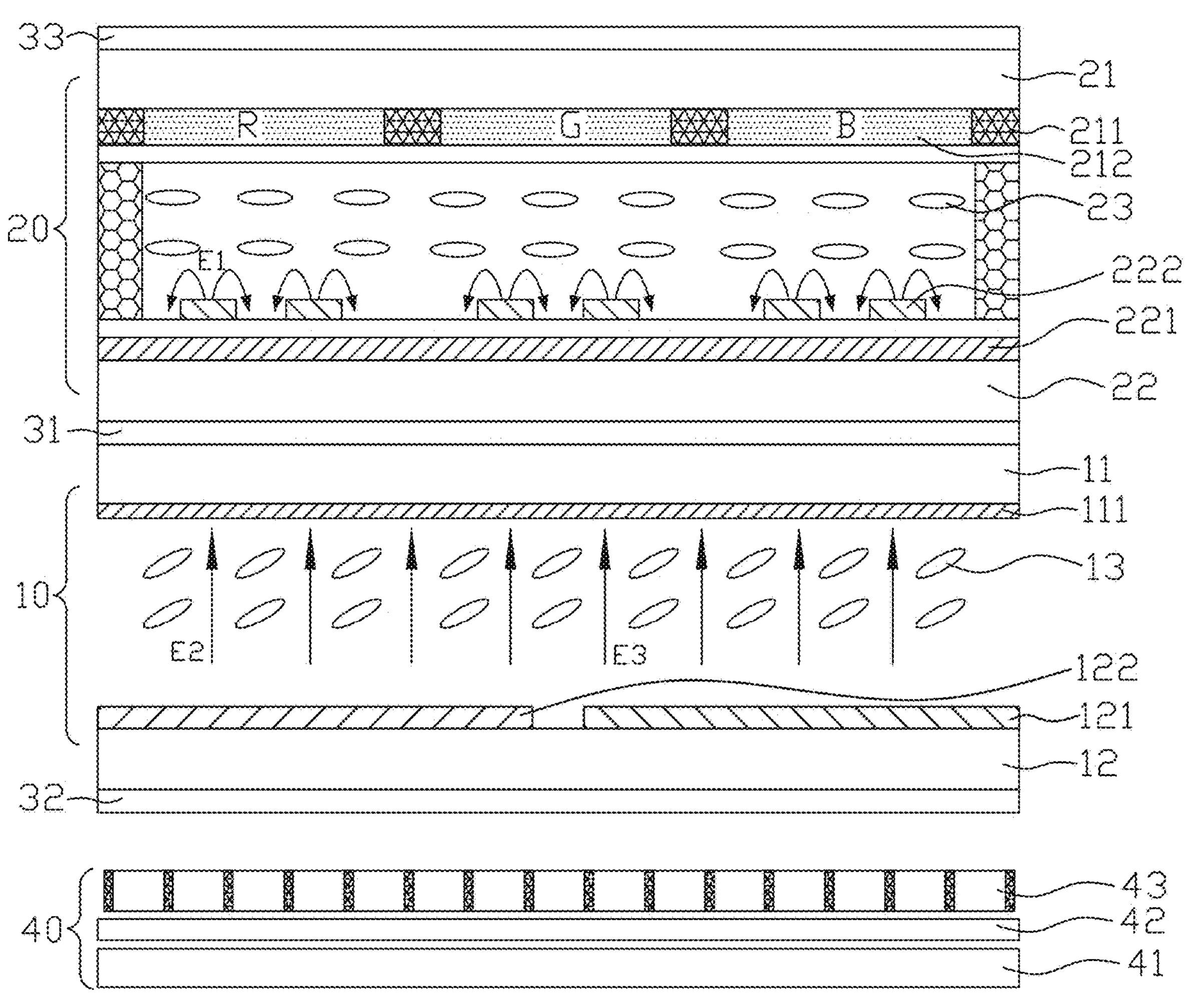
FIG. 15 is a schematic diagram of the display device in the fourth wide and narrow viewing angle mode of the present invention.
FIG. 16 is a schematic diagram of the planar structure of the display device in the fourth wide and narrow viewing angle mode of the present invention.

Specifically, the wide and narrow viewing angle modes include multiple viewing angle modes. In this embodiment, the wide and narrow viewing angle modes include a full-wide viewing angle mode (FIGS. 9 and 10), a left-narrow and right-wide viewing angle mode (FIGS. 11 and 12), a left-wide and right-narrow viewing angle mode (FIGS. 13 and 14), and a full-narrow viewing angle mode (FIGS. 15 and 16). The wide and narrow viewing angle switching signal is used to control the display device to switch between these wide and narrow viewing angle modes. Of course, according to actual needs, the display device can also have other wide and narrow viewing angle modes.

In this embodiment, as shown in FIG. 6, the action information is distance information, and the stored action is a stored distance. That is, in this embodiment, by monitoring the distance information between an object and the display panel, a wide and narrow viewing angle switching signal is sent and the switching between wide and narrow viewing angle modes is controlled. The control method includes:

Step S11: monitoring the distance information of an object from the display panel.

Step S21: comparing the distance information with the stored distance.

Step S31: when the distance information is less than the stored distance, sending a wide and narrow viewing angle switching signal, and controlling switching between wide and narrow viewing angle modes. For example, when a user needs to control switching between wide and narrow viewing angle modes, the user can use bands or other objects to cover or touch a distance sensor. After detecting that the distance sensor is covered or an object is approaching the distance sensor, the system sends a wide and narrow viewing angle switching signal and controls switching between wide and narrow viewing angle modes.

Step S32: when the distance information is greater than or equal to the stored distance, the system will not send a wide and narrow viewing angle switching signal and will maintain the current wide and narrow viewing angle mode.

Specifically, the stored distance can be set based on the sensitivity of triggering the switching between wide and narrow viewing angle modes. For example, the stored distance is 3 cm. If the distance between the object and the display panel is detected to be less than 3 cm, the system sends a wide and narrow viewing angle switching signal and controls switching between wide and narrow viewing angle modes. The larger the value of the stored distance, the higher the sensitivity.

Further, the control method also includes:

monitoring a first duration at which the distance information is less than the stored distance.

when the first duration is greater than a first preset time, sending a wide and narrow viewing angle switching signal, and controlling switching between wide and narrow viewing angle modes to prevent accidental triggering. For example, a user may unintentionally approach the distance sensor, which may also result in the distance information being smaller than the stored distance. Therefore, in order to prevent accidental triggering, it is necessary for the user to approach the distance sensor with hands or other objects for a certain period of time (such as 1 second) before the system can send a wide and narrow viewing angle switching signal and control switching between wide and narrow viewing angle modes. The specific first preset time can be set according to the actual situation to provide users with a better user experience.

Further, the control method includes:

after the distance information is detected to be less than the stored distance, and thereafter the distance information is detected to be greater than or equal to the stored distance, it is recorded as a triggering action and the wide and narrow viewing angle switching signal is sent, to prevent users from using their hands or other objects to approach the distance sensor for too long, causing switching between wide and narrow viewing angle modes repeatedly. For example, when the distance sensor is approached by hands or other objects for a long time (such as 3 S) without leaving, in order to avoid the system from repeatedly sending a wide and narrow viewing angle switching signal, therefore, when the distance information is detected to be less than the stored distance and thereafter the distance information is detected to be greater than or equal to the stored distance, in which case a triggering action is recorded and the system only sends a wide and narrow viewing angle switching signal one time, thereby increasing the user experience.

In this embodiment, the wide and narrow viewing angle switching signal is a reset switching signal, and the reset switching signal is used to control the wide and narrow viewing angle modes to switch to the initial viewing angle mode. That is, when the wide and narrow viewing angle switching signal is sent, the display device is controlled to switch to the initial viewing angle mode, wherein the initial viewing angle mode can be set according to the preferred viewing angle mode of the user. Of course, in other embodiments, the wide and narrow viewing angle switching signal is a cyclic switching signal, and the cyclic switching signal is used to control the wide and narrow viewing angle modes to be switched cyclically, that is, be switched cyclically between the full-wide viewing angle mode (FIGS. 9 and 10), the left-narrow and right-wide viewing angle mode (FIGS.

11 and 12), the left-wide and right-narrow viewing angle mode (FIGS. 13 and 14), and the full-narrow viewing angle mode (FIGS. 15 and 16) in a preset order.

Figure 1:
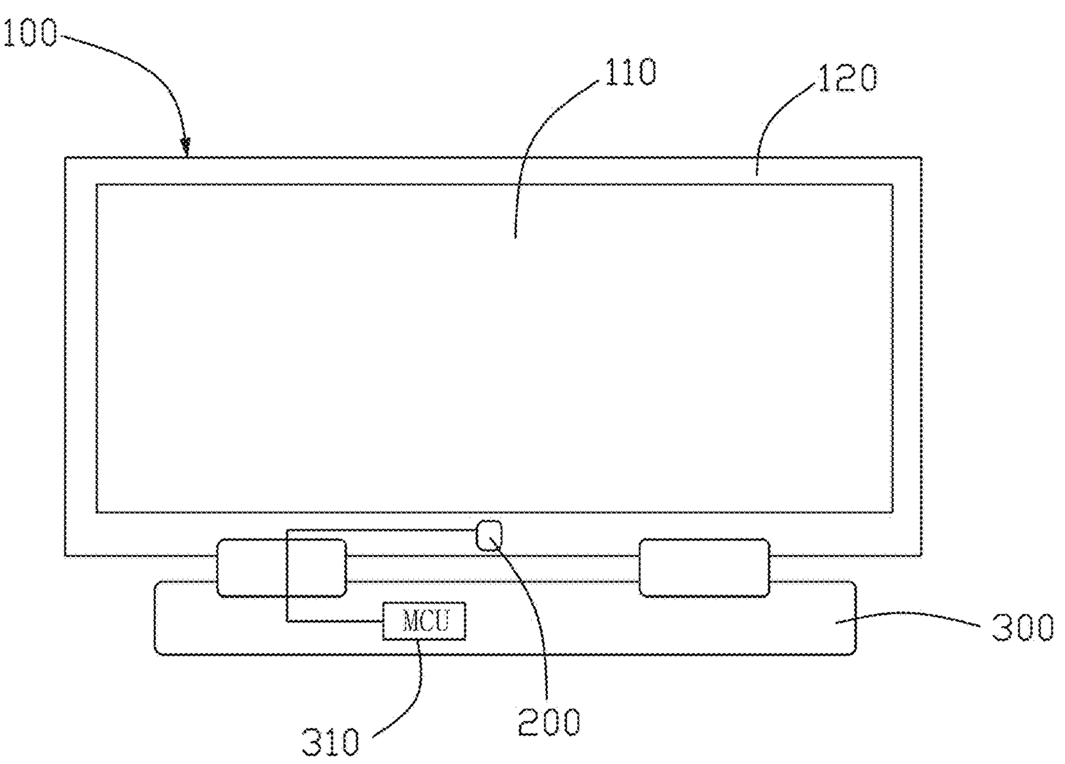
FIG. 1 is a schematic diagram of the display device in the present invention.
Figure 2:
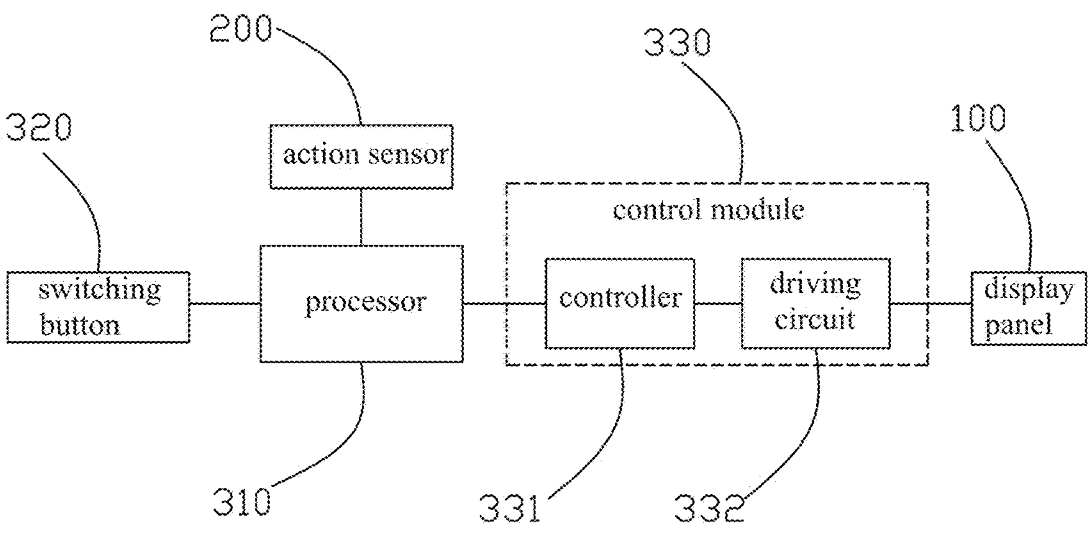
FIG. 2 is a schematic diagram of the circuit of the display device in the present invention.
Figure 3:
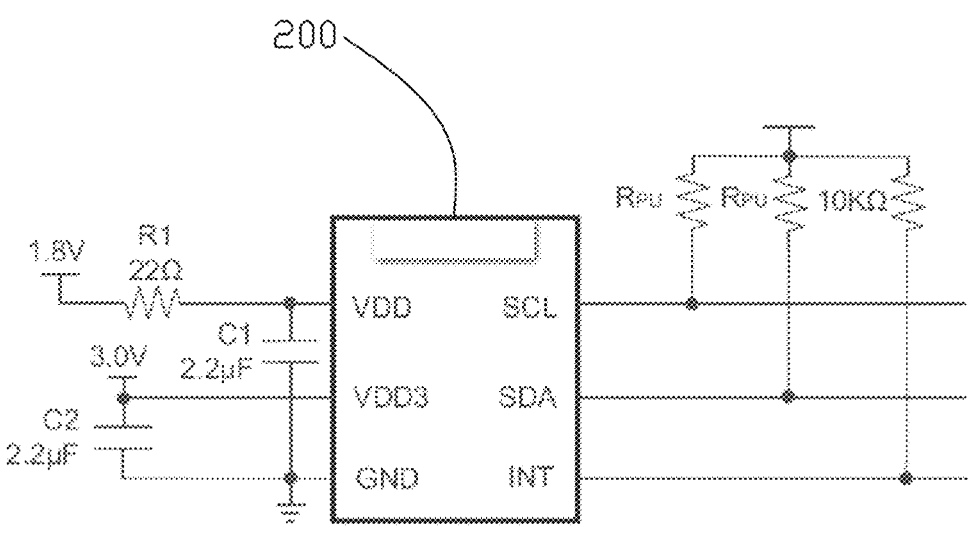
FIG. 3 is a schematic diagram of the action sensor and peripheral circuit in the present invention.
Figure 9:
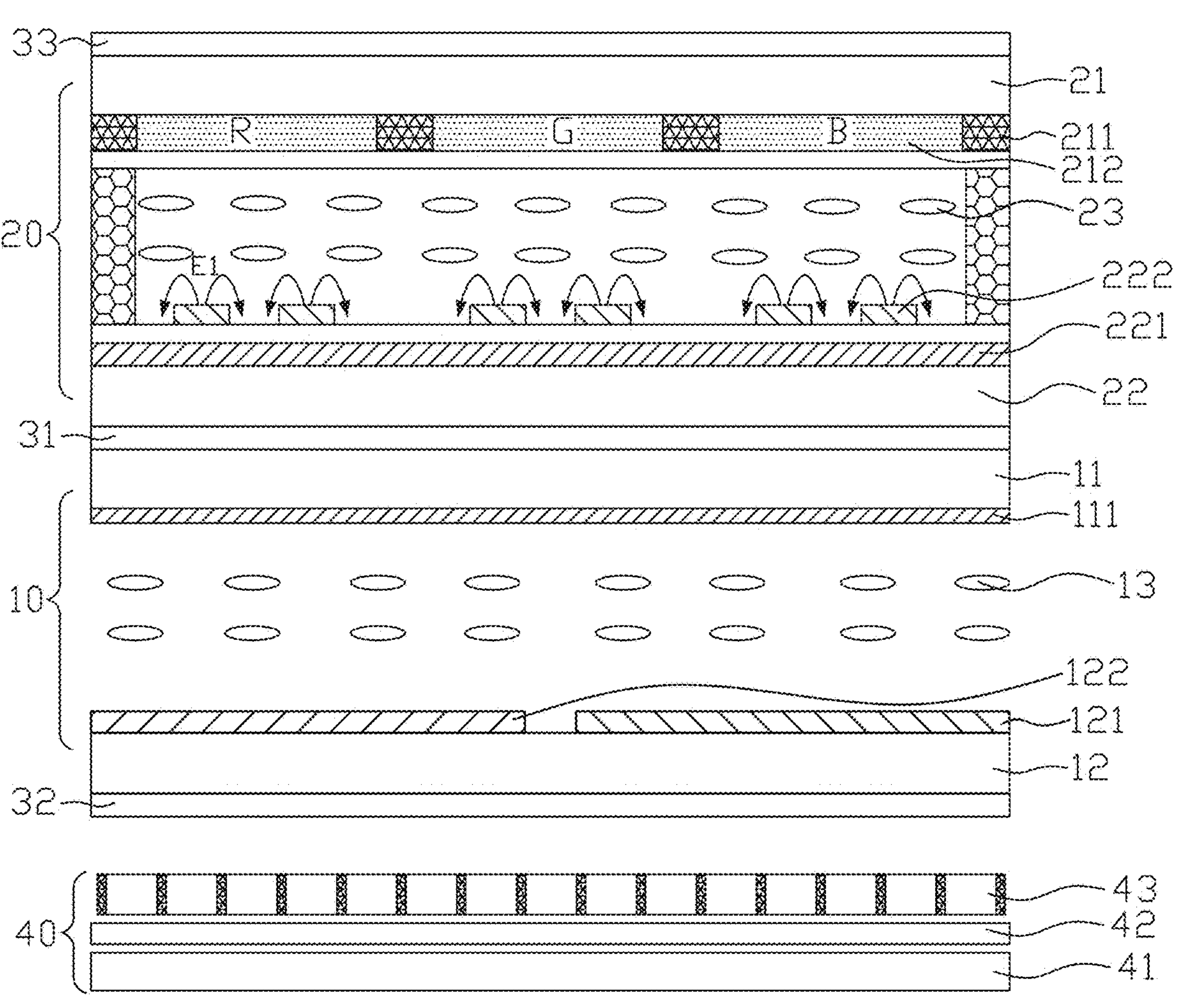
FIG. 9 is a schematic diagram of the display device in the first wide and narrow viewing angle mode of the present invention.
Figure 10:
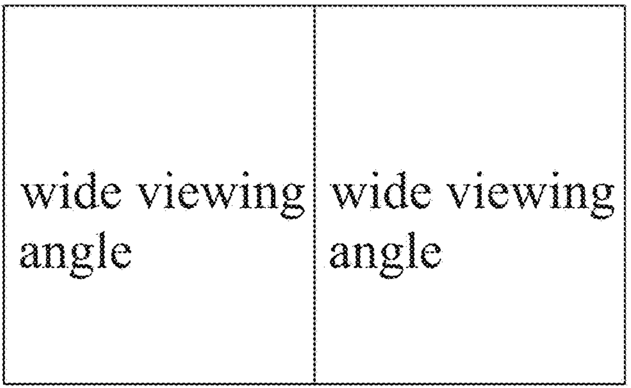
FIG. 10 is a schematic diagram of the planar structure of the display device in the first wide and narrow viewing angle mode of the present invention.
Figures 11, 12:
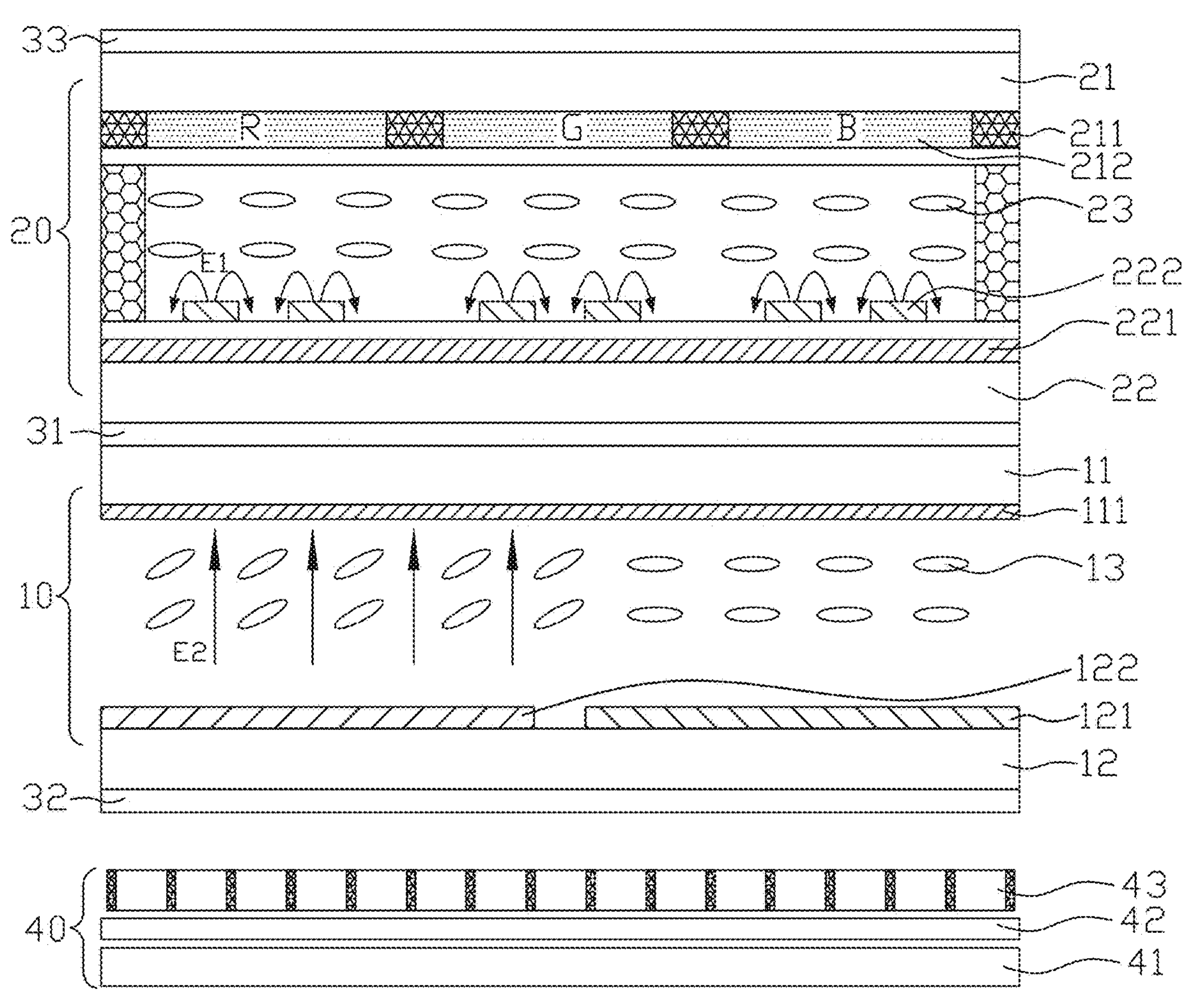
FIG. 11 is a schematic diagram of the display device in the second wide and narrow viewing angle mode of the present invention.
FIG. 12 is a schematic diagram of the planar structure of the display device in the second wide and narrow viewing angle mode of the present invention.
Figure 13:
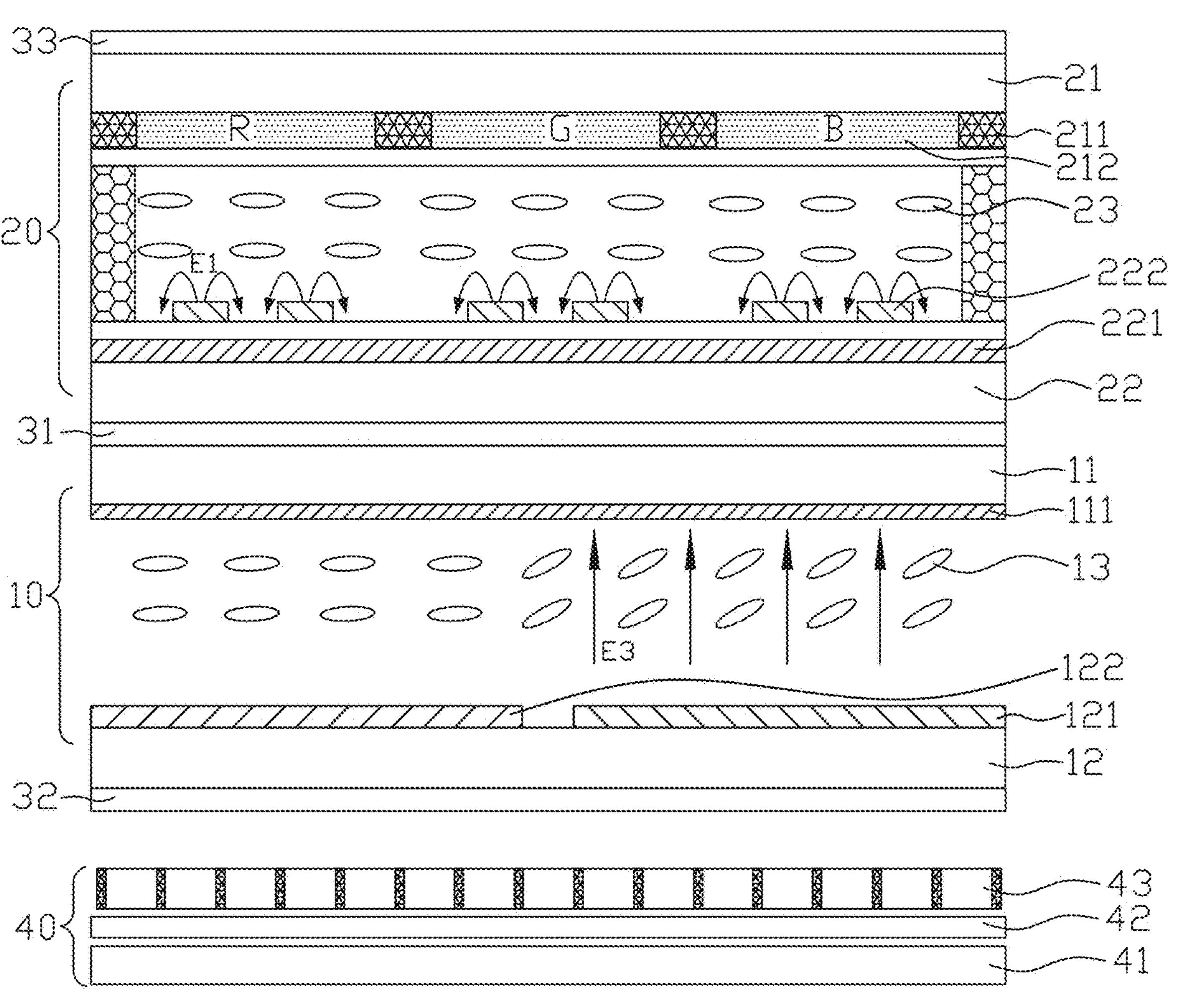
FIG. 13 is a schematic diagram of the display device in the third wide and narrow viewing angle mode of the present invention.

FIG. 1 is a schematic diagram of the display device in the present invention. FIG. 2 is a schematic diagram of the circuit of the display device in the present invention. FIG. 3 is a schematic diagram of the action sensor and peripheral circuit in the present invention. FIG. 9 is a schematic diagram of the display device in the first wide and narrow viewing angle mode of the present invention. FIG. 10 is a schematic diagram of the planar structure of the display device in the first wide and narrow viewing angle mode of the present invention. FIG. 11 is a schematic diagram of the display device in the second wide and narrow viewing angle mode of the present invention. FIG. 12 is a schematic diagram of the planar structure of the display device in the second wide and narrow viewing angle mode of the present invention. FIG. 13 is a schematic diagram of the display device in the third wide and narrow viewing angle mode of the present invention. FIG. 14 is a schematic diagram of the planar structure of the display device in the third wide and narrow viewing angle mode of the present invention. FIG. 15 is a schematic diagram of the display device in the fourth wide and narrow viewing angle mode of the present invention. FIG. 16 is a schematic diagram of the planar structure of the display device in the fourth wide and narrow viewing angle mode of the present invention.

As shown in FIGS. 1 to 3 and FIGS. 9 to 16, this embodiment also provides a display device with switchable wide and narrow viewing angles, and the display device is controlled using the control method described above.

The display device includes a display panel 100 capable of switching between wide and narrow viewing angles, and a circuit board 300 for controlling the display panel 100. An action sensor 200 is provided on the display panel 100 or/and the circuit board 300, and the action sensor 200 is used to acquire action information of a user. Specifically, the action sensor 200 will acquire the action information of the user and transmit it to the circuit board 300. The circuit board 300 processes and analyzes the action information. When the action information is matched with the stored action, the circuit board 300 sends a wide and narrow viewing angle switching signal and controls switching between wide and narrow viewing angle modes.

Further, the circuit board 300 is provided with a processor (MCU) 310. The action sensor 200 and the display panel 100 are electrically connected to the processor 310. The processor 310 controls the display panel 100 to switch between wide and narrow viewing angle modes based on the action information.

In this embodiment, the action sensor 200 is a distance sensor, wherein the distance sensor includes an infrared sensor and an ultrasonic sensor. Taking the infrared sensor as an example, the infrared sensor has an infrared transmitter and an infrared receiver. The infrared transmitter is used to emit infrared rays, and the infrared receiver is used to receive the infrared rays reflected by an object. The distance of the object or person is detected by measuring the energy of the infrared rays being reflected. For example, the detection distance is 3 cm. Of course, in other embodiments, the action sensor 200 can also be an image sensor to acquire gesture information or facial action information of a user.

As shown in FIG. 3, the infrared sensor is electrically connected to the processor 310 through a peripheral circuit. The infrared sensor converts the received analog signal into a digital signal and transmits it to the processor 310 for processing and analysis. The peripheral circuit is simple and can be directly arranged on the glass substrate of the display device.

As shown in FIG. 2, since in this embodiment the wide and narrow viewing angle switching signal is a reset switching signal, the display device further includes a switching button 320. The switching button 320 is used to control the wide and narrow viewing angle modes to be switched cyclically, that is, be switched cyclically between the full-wide viewing angle mode (FIG. 9 and FIG. 10), the left-narrow and right-wide viewing angle mode (FIG. 11 and FIG. 12), the left-wide and right-narrow viewing angle mode (FIG. 13 and FIG. 14), and the full-narrow viewing angle mode (FIG. 15 and FIG. 16) according to the preset order. Specifically, the switching button 320 can a reuse function key. Therefore, while satisfying the switching and resetting of multiple wide and narrow viewing angle modes, only one function key needs to be reused, there is no need to add additional keys to the keyboard, and the existing standard keyboard can be used.

Further, the circuit board 300 is further provided with a wide and narrow viewing angle control module 330, and the wide and narrow viewing angle control module 330 is used to control the display panel 100 to display under multiple wide and narrow viewing angle modes, such as the full-wide viewing angle mode (FIG. 9 and FIG. 10), the left-narrow and right-wide viewing angle mode (FIG. 11 and FIG. 12), the left-wide and right-narrow viewing angle mode (FIG. 13 and FIG. 14), and the full-narrow viewing angle mode (FIG. 15 and FIG. 16).

The wide and narrow viewing angle control module 330 includes a wide and narrow viewing angle controller 331 and a wide and narrow viewing angle driving circuit 332. The output end of the processor 310 is connected to the input end of the wide and narrow viewing angle controller 331, the output end of the wide and narrow viewing angle controller 331 is connected to the input end of the wide and narrow viewing angle driving circuit 332, and the output end of the wide and narrow viewing angle driving circuit 332 is connected to the display panel 100. The wide and narrow viewing angle controller 331 outputs different signals based on the processing results of the processor 310. The wide and narrow viewing angle driving circuit 332 applies different wide and narrow viewing angle driving voltages to the display panel 100 based on the signals output by the wide and narrow viewing angle controller 331, so that the display panel 100 displays different wide and narrow viewing angle modes.

As shown in FIG. 1, in this embodiment, the display panel 100 includes a display area 110 and a non-display area 120 located around the display area 110. The action sensor 200 is located on the glass substrate of the non-display area 120. Directly installing the action sensor 200 on the display panel 100 can increase the added value of the display panel and reduce the design cost for back-end customers. The action sensor 200 is an infrared sensor, with dimensions of 2 mm*1 mm*0.35 mm. The thickness of the glass substrate of the display panel 100 is 0.3-0.5 mm, allowing the infrared sensor to be installed on a glass substrate with a thickness of 0.4 mm, without exceeding the thickness of the glass substrate. Because the display panel 100 is also provided with a polarizer, the infrared sensor can even be installed on a glass substrate with a thickness of 0.3 mm. Due to the infrared sensor being installed on the glass substrate of the non-display area 120, therefore, it is also necessary to drill holes in the casing of the electronic device (e.g., computer) at the position near the screen edge to expose the infrared sensor.

Figure 4:
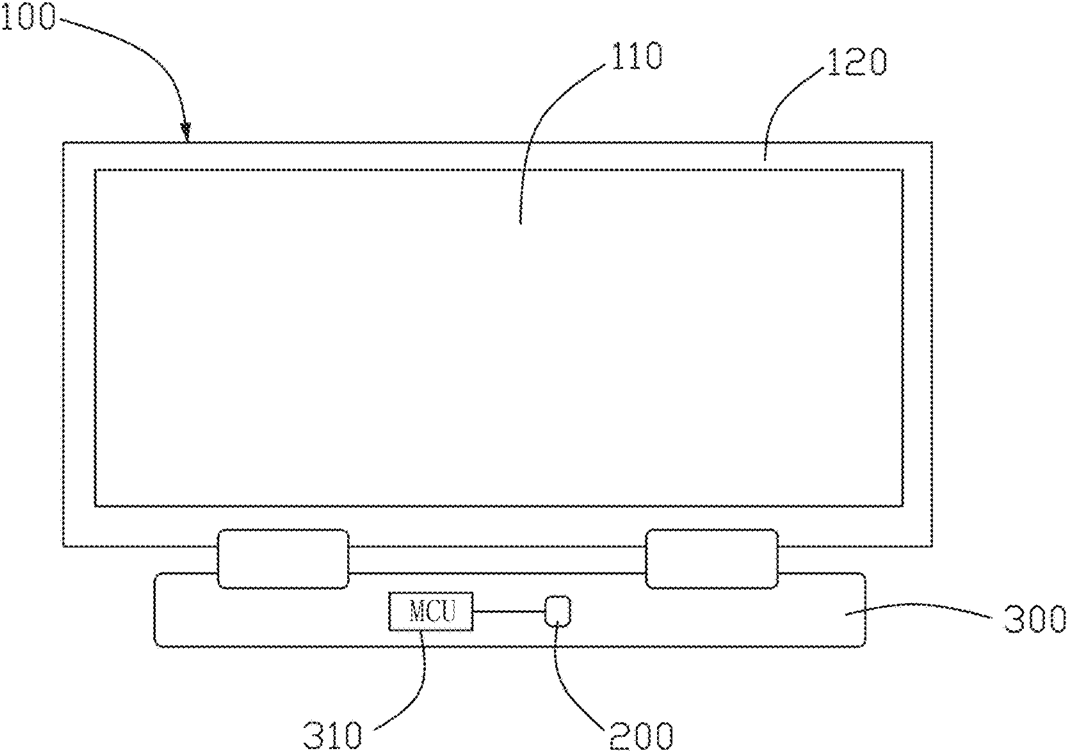
FIG. 4 is a schematic diagram of the display device in another embodiment of the present invention.

In other embodiments, as shown in FIG. 4, the action sensor 200 can also be installed on the circuit board 300, thereby reducing the signal transmission distance between the action sensor 200 and the processor 310 and improving the signal transmission efficiency. Similarly, it is still necessary to drill holes in the casing of the electronic device (e.g., computer) at the position near the screen edge to expose the action sensor 200.

As shown in FIGS. 9 to 16, the display panel 100 includes a light adjusting box 10 and an LCD box 20, with the light adjusting box 10 and the LCD box 20 being stacked to each other. In this embodiment, the light adjusting box 10 is located below the LCD box 20, that is, the light adjusting box 10 is located between the LCD box 20 and a backlight module 40. The light adjusting box 10 is used to control the viewing angle of the display device, and the LCD box 20 is used to control the display device to display normal pictures. Of course, the light adjusting box 10 can also be located above the LCD box 20, or both sides of the LCD box 20 are provided with light adjusting boxes 10.

The light adjusting box 10 includes a first substrate 11, a second substrate 12 arranged opposite to the first substrate 11, and a first liquid crystal layer 13 located between the first substrate 11 and the second substrate 12. Preferably, the first liquid crystal layer 13 adopts positive liquid crystal molecules, i.e., liquid crystal molecules with positive dielectric anisotropy. At the initial state, the first liquid crystal layer 13 is in a lying posture, meaning that the positive liquid crystal molecules in the first liquid crystal layer 13 are aligned parallel to the first substrate 10 and the second substrate 20, and the alignment direction of the positive liquid crystal molecules on the side near the first substrate 10 is opposite and parallel to the alignment direction of the positive liquid crystal molecules on the side near the second substrate 20. Of course, the positive liquid crystal molecules can have a small pre-tilt angle (such as less than 4.5°) during initial alignment, meaning that the positive liquid crystal molecules have a small angle relative to the first substrate 10 and the second substrate 20 at the initial stage, which can accelerate deflection of the positive liquid crystal molecules towards the vertical direction when switching to a narrow viewing angle. Of course, in other embodiments, the first liquid crystal layer 13 may also adopt negative liquid crystal molecules, and the negative liquid crystal molecules in the first liquid crystal layer 13 are perpendicular or approximately perpendicular to the first substrate 10 and the second substrate 20.

The first substrate 11 is provided with a first polarizer 31, and the second substrate 12 is provided with a second polarizer 32. The transmission axis of the first polarizer 31 is perpendicular to the transmission axis of the second polarizer 32. The first polarizer 31 is located between the light adjusting box 10 and the LCD box 20, and the second polarizer 32 is located on the side of the second substrate 12 away from the first liquid crystal layer 13. The first substrate 11 is provided with a viewing angle control electrode 111 on the side facing the first liquid crystal layer 13, and the second substrate 12 is provided with a first electrode 121 and a second electrode 122 that cooperate with the viewing angle control electrode 111 on the side facing the first liquid crystal layer 13. In this embodiment, the viewing angle control electrode 111 is a planar electrode that covers the first substrate 11, and the first electrode 121 and the second electrode 122 are block electrodes that cover the second substrate 12. The first electrode 121 and the second electrode 122 are used to respectively control different areas to switch between wide and narrow viewing angles. For example, the first electrode 121 is used to control right half of the display panel 100 to switch between wide and narrow viewing angles, and the second electrode 122 is used to control left half of the display panel 100 to switch between wide and narrow viewing angles.

The LCD box 20 includes a color film substrate 21, an array substrate 22 arranged opposite to the color film substrate 21, and a second liquid crystal layer 23 located between the color film substrate 21 and the array substrate 22. Preferably, the second liquid crystal layer 23 adopts positive liquid crystal molecules, i.e., liquid crystal molecules with positive dielectric anisotropy. In the initial state, the positive liquid crystal molecules in the second liquid crystal layer 23 are aligned parallel to the color film substrate 21 and the array substrate 22. The alignment direction of the positive liquid crystal molecules on the side near the color film substrate 21 is parallel or reverse to the alignment direction of the positive liquid crystal molecules on the side near the array substrate 22. In other embodiments, the array substrate 22 and the first substrate 11 may share a common substrate to reduce the box thickness of the display panel.

The LCD box 20 is provided with a third polarizer 33 on the side away from the light adjusting box 10. The transmission axis of the polarizer located between the light adjusting box 10 and the LCD box 20 is perpendicular to the transmission axis of the third polarizer 33. In this embodiment, the third polarizer 33 is arranged on the color film substrate 21, and the transmission axis of the third polarizer 33 is perpendicular to the transmission axis of the first polarizer 31.

On the color film substrate 21, there are color resists 212 arranged in an array and a black matrix 211 used to separate the color resists 212 from each other. The color resists 212 include red (R), green (G), and blue (B) color resistance materials, to correspondingly form red (R), green (G), and blue (B) sub-pixels.

On the side facing the second liquid crystal layer 23, the array substrate 22 is provided with a plurality of scanning lines and a plurality of data lines, which are insulated and intersected to form a plurality of pixel units. Each pixel unit is provided with a pixel electrode 222 and a thin film transistor therein, and through the thin film transistor, the pixel electrode 222 is electrically connected to the data line adjacent to the thin film transistor. Specifically, the thin film transistor includes a gate, an active layer, a drain, and a source. The gate is located on the same layer as the scanning line and is electrically connected to the scanning line. The gate and the active layer are separated by an insulation layer, the source is electrically connected to the data line, and the drain is electrically connected to the pixel electrode 222 through a contact hole.

As shown in FIG. 9, in this embodiment, a common electrode 221 is further provided on one side of the array substrate 22 facing the second liquid crystal layer 23. The common electrode 221 and the pixel electrode 222 are located in different layers and insulated through an insulation layer. The common electrode 221 can be located above or below the pixel electrode 222 (as shown in FIG. 9, the common electrode 221 is located below the pixel electrode 222). Preferably, the common electrode 221 is a planar electrode covering the whole surface, and the pixel electrode 222 is a block electrode arranged as a whole within each pixel unit or a slit electrode with multiple electrode strips, to thereby form a fringe field switching (FFS) display mode. Of course, in other embodiments, the pixel electrode 222 and the common electrode 221 can be located on the same layer, but they are insulated and separated from each other, wherein the pixel electrode 222 and the common electrode 221 can each include multiple electrode strips, and the electrode strips of the pixel electrode 222 and the common electrode 221 are alternately arranged, to thereby form an in-plane switching (IPS) display mode. Alternatively, in other embodiments, the array substrate 22 is provided with pixel electrodes 222 on one side facing the second liquid crystal layer 23, and the color film substrate 21 is provided with a common electrode 221 on one side facing the second liquid crystal layer 23, so as to form a TN or VA display mode. For other introductions of the TN or VA display mode, please refer to the prior art and will not be repeated here.

Specifically, the first substrate 11, the second substrate 12, the color film substrate 21 and the array substrate 22 can be made of materials such as glass, acrylic acid, and polycarbonate. The materials for the viewing angle control electrode 111, the first electrode 121, the second electrode 122, the common electrode 221 and the pixel electrode 222 can be indium tin oxide (ITO) or indium zinc oxide (IZO), etc.

Further, a backlight module 40 is provided on the side of the light adjusting box 10 away from the LCD box 20. Preferably, the backlight module 40 adopts a collimated backlight (CBL) mode, which can collect light and ensure display effect.

The backlight module 40 includes a backlight source 41 and an anti-peeping layer 43, and the anti-peeping layer 43 is used to reduce the range of light emission angles. A brightening film 42 is further provided between the backlight source 41 and the anti-peeping layer 43, and the brightening film 42 increases the brightness of the backlight module 40. Specifically, the anti-peeping layer 43 is a miniature louver structure that can block light with a larger incidence angle, allowing light with a smaller incidence angle to pass through and reducing the angle range of light passing through the anti-peeping layer 43. The anti-peeping layer 43 includes a plurality of parallel light blocking walls and transparent holes located between adjacent light blocking walls, with light absorbing materials on both sides of the light blocking walls. The backlight module 41 can be an edge-type backlight module or a direct-type backlight module.

As shown in FIG. 9 and FIG. 10, in the full-wide viewing angle mode, the common electrode 221 is applied with a DC common voltage (Vcom), the viewing control electrode 111 is applied with a first voltage, and both the first electrode 121 and the second electrode 122 are applied with a second voltage. Both the first voltage and the second voltage are the same as the DC common voltage, and there is no vertical electric field or a small vertical electric field (such as less than 0.5V) formed between the first substrate 11 and the second substrate 12. The positive liquid crystal molecules of the first liquid crystal layer 13 generally will not deflect in the vertical direction and remain in a lying posture, thereby displaying in a full-wide viewing angle. The pixel electrode 222 is applied with a corresponding grayscale voltage, and a pressure difference is formed between the pixel electrode 222 and the common electrode 221 to generate a horizontal electric field (E1 in FIG. 9), causing the positive liquid crystal molecules to deflect horizontally in a direction parallel to the horizontal electric field. The grayscale voltage includes 0-255 grayscale voltages. When different grayscale voltages are applied to the pixel electrode 222, the pixel unit presents different brightness, thereby displaying different images, to achieve normal display of the display device in a full-wide viewing angle.

As shown in FIG. 11 and FIG. 12, in the left-narrow and right-wide viewing angle mode, the common electrode 221 is applied with a DC common voltage (Vcom), the viewing control electrode 111 is applied with a first voltage, the first electrode 121 is applied with a second voltage, and the second electrode 122 is applied with a third voltage. Both the first voltage and the second voltage are the same as the DC common voltage, while the third voltage is an AC voltage that fluctuates around the DC common voltage. In the right half of the display panel 100, there is no vertical electric field or a small vertical electric field (such as less than 0.5V) formed between the first substrate 11 and the second substrate 12, and the positive liquid crystal molecules of the first liquid crystal layer 13 generally will not deflect in the vertical direction and remain in a lying posture, thereby displaying in a wide viewing angle. However, in the left half of the display panel 100, a large vertical electric field is formed between the first substrate 11 and the second substrate 12 (E2 in FIG. 11), and the positive liquid crystal molecules of the first liquid crystal layer 13 will deflect significantly in the vertical deflection to a tilted state, causing the brightness of the display panel 100 to decrease in oblique directions and the viewing angle to become narrowed, thereby achieving displaying in a narrow viewing angle. The display panel 100 ultimately achieves displaying in a left-narrow and right-wide viewing angle. The pixel electrode 222 is applied with a corresponding grayscale voltage, and a pressure difference is formed between the pixel electrode 222 and the common electrode 221 to generate a horizontal electric field (E1 in FIG. 11), causing the positive liquid crystal molecules to deflect horizontally in a direction parallel to the horizontal electric field. The grayscale voltage includes 0-255 grayscale voltages. When different grayscale voltages are applied to the pixel electrode 222, the pixel unit presents different brightness, thereby displaying different images, to achieve normal display of the display device in the left-narrow and right-wide viewing angle mode.

As shown in FIG. 13 and FIG. 14, in the left-wide and right-narrow viewing angle mode, the common electrode 221 is applied with a DC common voltage (Vcom), the viewing control electrode 111 is applied with a first voltage, the first electrode 121 is applied with a third voltage, and the second electrode 122 is applied with a second voltage. Both the first voltage and the second voltage are the same as the DC common voltage, while the third voltage is an AC voltage that fluctuates around the DC common voltage. In the right half of the display panel 100, a large vertical electric field is formed between the first substrate 11 and the second substrate 12 (E3 in FIG. 13), and the positive liquid crystal molecules in the first liquid crystal layer 13 will deflect significantly in the vertical deflection to a tilted state, causing the brightness of the display panel 100 to decrease in oblique directions and the viewing angle to become narrowed, thereby achieving displaying in a narrow viewing angle. However, in the left half of the display panel 100, there is no vertical electric field or a small vertical electric field (such as less than 0.5V) formed between the first substrate 11 and the second substrate 12, and the positive liquid crystal molecules of the first liquid crystal layer 13 generally will not deflect in the vertical direction and remain in a lying posture, thereby displaying in a wide viewing angle. The display panel 100 ultimately achieves displaying in a left-wide and right-narrow viewing angle. The pixel electrode 222 is applied with a corresponding grayscale voltage, and a pressure difference is formed between the pixel electrode 222 and the common electrode 221 to generate a horizontal electric field (E1 in FIG. 13), causing the positive liquid crystal molecules to deflect horizontally in a direction parallel to the horizontal electric field. The grayscale voltage includes 0-255 grayscale voltages. When different grayscale voltages are applied to the pixel electrode 222, the pixel unit presents different brightness, thereby displaying different images, to achieve normal display of the display device in the left-wide and right-narrow viewing angle mode.

As shown in FIG. 15 and FIG. 16, in the full-narrow viewing angle mode, the common electrode 221 is applied with a DC common voltage (Vcom), the viewing angle control electrode 111 is applied with a first voltage, and both the first electrode 121 and the second electrode 122 are applied with a third voltage. The first voltage is the same as the DC common voltage, while the third voltage is an AC voltage that fluctuates around the DC common voltage. A large vertical electric field is formed between the first substrate 11 and the second substrate 12 (E2 and E3 in FIG. 15), and the positive liquid crystal molecules of the first liquid crystal layer 13 will deflect significantly in the vertical deflection to a tilted state, causing the brightness of the display panel 100 to decrease in oblique directions and the viewing angle to become narrowed, thereby achieving displaying in a full-narrow viewing angle. The pixel electrode 222 is applied with a corresponding grayscale voltage, and a pressure difference is formed between the pixel electrode 222 and the common electrode 221 to generate a horizontal electric field (E1 in FIG. 15), causing the positive liquid crystal molecules to deflect horizontally in a direction parallel to the horizontal electric field. The grayscale voltage includes 0-255 grayscale voltages. When different grayscale voltages are applied to the pixel electrode 222, the pixel unit presents different brightness, thereby displaying different images, to achieve normal display of the display device in the full-narrow viewing angle mode.

Specifically, the voltage signals applied to the viewing angle control electrode 111, the first electrode 121 and the second electrode 122 are controlled based on different analysis results of the processor 310.

Second Embodiment

Figure 7:
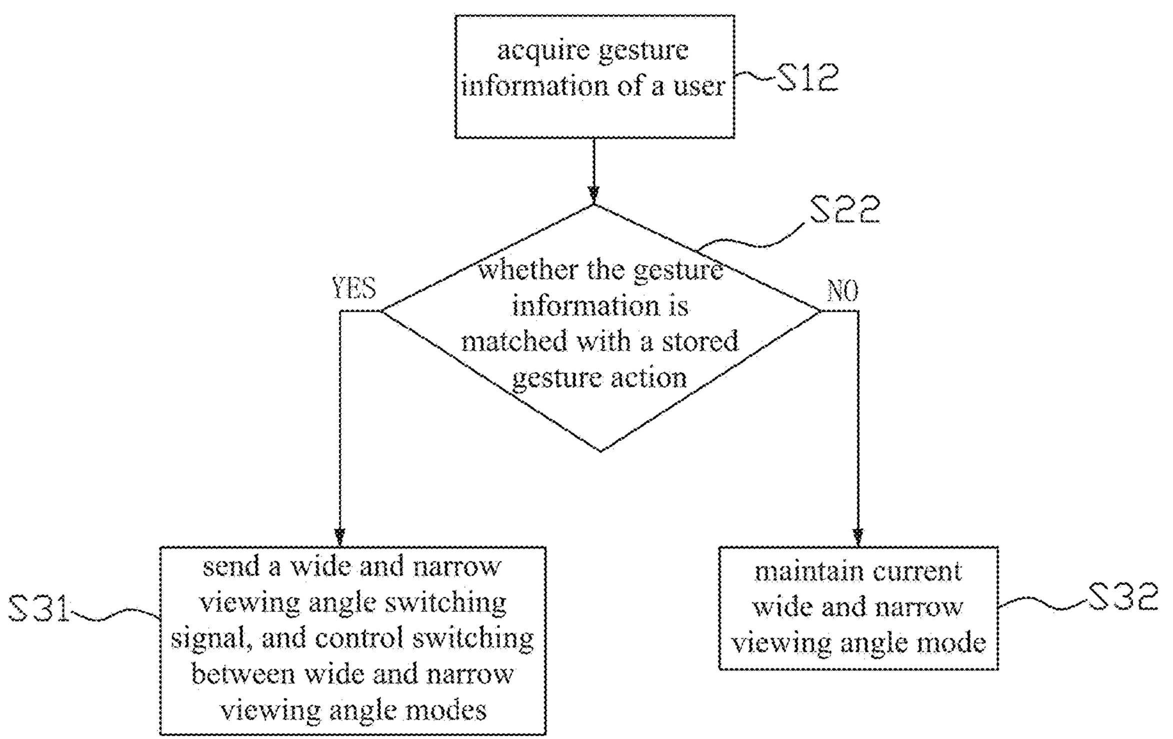
FIG. 7 is a flowchart of the control method in the second embodiment of the present invention.

FIG. 7 is a flowchart of the control method in the second embodiment of the present invention. As shown in FIG. 7, the display device and control method for switching between wide and narrow viewing angles provided in the second embodiment of the present invention are basically the same as those in the first embodiment (FIGS. 1 to 6 and FIGS. 9 to 16). The difference is that in this embodiment, the action information is gesture information, and the stored action is a stored gesture action. That is, in this embodiment, by monitoring the gesture information of a user, a wide and narrow viewing angle switching signal is sent based on the gesture information, and the switching between wide and narrow viewing angle modes is controlled. The control method includes:

Step S12: acquiring gesture information of a user.

Step S22: comparing the gesture information with a stored gesture action.

Step S31: when the gesture information is matched with the stored gesture action, sending a wide and narrow viewing angle switching signal, and controlling switching between wide and narrow viewing angle modes. For example, when a user needs to control switching between wide and narrow viewing angle modes, the user can use his/her hand to make "OK" gesture, five finger open gesture, first gesture, or thumbs up gesture, etc., and then the gesture information made by the user is compared with the stored gesture actions. Based on the comparison result, the system sends a wide and narrow viewing angle switching signal for switching between wide and narrow viewing angle modes. For example, if the system recognizes that the user has made an "OK" gesture, a wide and narrow viewing angle switching signal is sent for switching to the next wide and narrow viewing angle mode; if the system recognizes that the user has made a thumbs up gesture, a wide and narrow viewing angle switching signal is sent for switching to the previous wide and narrow viewing angle mode; if the system recognizes that the user has made a five finger open gesture, a wide and narrow viewing angle switching signal is sent for switching to the initial viewing angle mode; if the system recognizes that the user has made a first gesture, a wide and narrow viewing angle switching signal is sent for switching to the last viewing angle mode.

Of course, based on comparison results, the system can also send viewing angle switching signals corresponding to different gesture actions. For example, if the system recognizes that the user has made an "OK" gesture, a full-wide viewing angle switching signal is sent for switching to the full-wide viewing angle mode; if the system recognizes that the user has made a five finger open gesture, a full-narrow viewing angle switching signal is sent for switching to the full-narrow viewing angle mode; if the system recognizes that the user has made a thumbs up gesture, a left-narrow and right-wide viewing angle switching signal is sent for switching to the left-narrow and right-wide viewing angle mode; if the system recognizes that the user has made a first gesture, a left-wide and right-narrow viewing angle switching signal is sent for switching to the left-wide and right-narrow viewing angle mode. Therefore, users can set different viewing angle modes for different gestures according to their own preferences, so as to quickly switch to the corresponding viewing angle modes.

In other embodiments, the effect and switching between wide and narrow viewing angles can also be controlled by setting other gestures. For example, the user can use an upward gesture to control the upper half for anti-peeping, a downward gesture to control the lower half for anti-peeping, a left gesture to control the left half for anti-peeping, a right gesture to control the right half for anti-peeping, a forward gesture to control the increase of the anti-peeping area, a backward gesture to control the reduction of the anti-peeping area, a clockwise circle gesture to increase the brightness and increase the wide viewing angle effect, a counterclockwise circle gesture to reduce the brightness and increase the narrow viewing angle effect, and a waving gesture to control the viewing angle to reset and switch to the initial viewing angle mode.

Step S32: when the gesture information is not matched with the stored gesture action, the system will not send a wide and narrow viewing angle switching signal and will maintain the current wide and narrow viewing angle mode.

Further, in order for determining that the gesture information is matched with the stored gesture action, the similarity between the gesture information and the stored gesture action is required to be greater than 90%. In order to prevent system misjudgment, after comparative analysis, the system only sends a wide and narrow viewing angle switching signal when the similarity between the gesture information and the stored gesture action is greater than 90%.

Further, the control method also includes:

monitoring a second duration of the gesture information. when the second duration is greater than a second preset time, sending a wide and narrow viewing angle switching signal, and controlling switching between wide and narrow viewing angle modes to prevent accidental triggering. For example, a user may unintentionally make a gesture similar to the stored gesture action, which may also cause the system to send a wide and narrow viewing angle switching signal. Therefore, in order to prevent accidental triggering, it is necessary for the user to make a gesture and maintain it for a certain period of time (such as 0.5 S) before the system can send a wide and narrow viewing angle switching signal and control switching between wide and narrow viewing angle modes. The specific second preset time can be set according to the actual situation to provide users with a better user experience.

This embodiment also provides a display device with switchable wide and narrow viewing angles, and the display device is controlled using the control method described above.

The display device includes a display panel 100 capable of switching between wide and narrow viewing angles, and a circuit board 300 for controlling the display panel 100. An action sensor 200 is provided on the display panel 100 or/and the circuit board 300, and the action sensor 200 is used to acquire the action information of the user. Specifically, the action sensor 200 will acquire the action information of the user and transmit it to the circuit board 300. The circuit board 300 processes and analyzes the action information. When the action information is matched with the stored action, the circuit board 300 sends a wide and narrow viewing angle switching signal and controls switching between wide and narrow viewing angle modes.

The difference between the display device with switchable wide and narrow viewing angles in this embodiment and the display device in the first embodiment (FIGS. 1 to 4 and FIGS. 9 to 16) is that in this embodiment, the action sensor 200 is an image sensor, because in this embodiment, the gesture information of the user needs to be acquired, and the image sensor can capture the user's image to analyze the gestures made by the user. Of course, in other embodiments, the action sensor 200 may also use special infrared sensors, such as sensors with infrared gesture recognition.

In this embodiment, the display device does not need to set the switching button 320, as the user can make a variety of gestures, which is sufficient to meet the needs of switching between different wide and narrow viewing angles based on various gesture information.

Those skilled in the art can understand that the remaining structures and working principles of this embodiment are the same as those of the first embodiment, and will not be repeated here.

Third Embodiment

Figure 8:
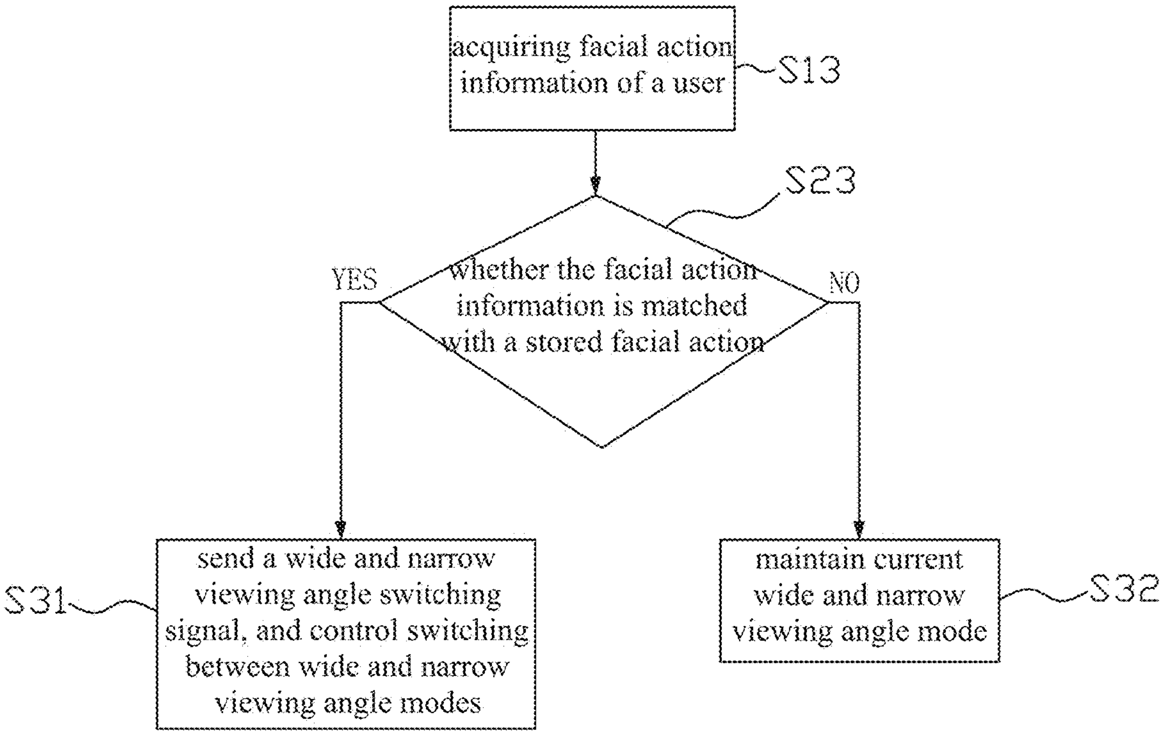
FIG. 8 is a flowchart of the control method in the third embodiment of the present invention.

FIG. 8 is a flowchart of the control method in the third embodiment of the present invention. As shown in FIG. 8, the display device and control method for switching between wide and narrow viewing angles provided in the third embodiment of the present invention are basically the same as those in the first embodiment (FIGS. 1 to 6 and FIGS. 9 to 16). The difference is that in this embodiment, the action information is facial action information, and the stored action is a stored facial action. That is, in this embodiment, by monitoring the facial action information of a user, a wide and narrow viewing angle switching signal is sent based on the facial action information, and the switching between wide and narrow viewing angle modes is controlled. The control method includes:

Step S13: acquiring facial action information of a user.

Step S23: comparing the facial action information with a stored facial action.

Step S31: when the facial action information is matched with the stored facial action, sending a wide and narrow viewing angle switching signal, and controlling switching between wide and narrow viewing angle modes. For example, when a user needs to control switching between wide and narrow viewing angle modes, the user can make facial actions such as opening and closing the left eyes, opening and closing the right eyes, smiling, laughing, etc. Then, the facial action information of the user is compared with the stored facial actions. Based on the comparison result, the system sends a wide and narrow viewing angle switching signal for switching between wide and narrow viewing angles. For example, if the system recognizes that the user has made a facial action of opening the left eye and closing the right eye, a wide and narrow viewing angle switching signal is sent for switching to the next wide and narrow viewing angle mode; if the system recognizes that the user has made a facial action of opening the right eye and closing the left eye, a wide and narrow viewing angle switching signal is sent for switching to the previous wide and narrow viewing angle mode; if the system recognizes that the user has made a facial action of smiling, a wide and narrow viewing angle switching signal is sent for switching to the initial viewing angle mode; if the system recognizes the facial action of laughing, a wide and narrow viewing angle switching signal is sent for switching to the last viewing angle mode.

Of course, based on comparison results, the system can also send viewing angle switching signals corresponding to facial actions. For example, if the system recognizes that the user has made a facial action of opening the left eye and closing the right eye, a left-wide and right-narrow viewing angle switching signal is sent for switching to the left-wide and right-narrow viewing angle mode; if the system recognizes that the user has made a facial action of opening the right eye and closing the left eye, a left-narrow and right-wide viewing angle switching signal is sent for switching to the left-narrow and right-wide viewing angle mode; if the system recognizes that the user has made a facial action of smiling, a full-wide viewing angle switching signal is sent for switching to the full-wide viewing angle mode; if the system recognizes the facial action of laughing, a full-narrow viewing angle switching signal is sent for switching to the full-narrow viewing angle mode. Therefore, users can set different viewing angle modes for different facial actions according to their own preferences, so as to quickly switch to the corresponding viewing angle modes.

Step S32: when the facial action information is not matched with the stored facial action, the system will not send a wide and narrow viewing angle switching signal and will maintain the current wide and narrow viewing angle mode.

Further, in order for determining that the facial action information is matched with the stored facial action, the similarity between the facial action information and the stored facial action is required to be greater than 90%. In order to prevent system misjudgment, after comparative analysis, the system only sends a wide and narrow viewing angle switching signal when the similarity between the facial action information and the stored facial action is greater than 90%.

Further, the control method also includes:

monitoring the third duration of the facial action information;

when the third duration is greater than a third preset time, sending a wide and narrow viewing angle switching signal, and controlling switching between wide and narrow viewing angle modes, to prevent accidental triggering. For example, a user may unintentionally make a facial action similar to the stored facial action, which may also cause the system to send a wide and narrow viewing angle switching signal. Therefore, in order to prevent accidental triggering, it is necessary for the user to make a facial action and maintain it for a certain period of time (such as 0.5 S) before the system can send a wide and narrow viewing angle switching signal and control switching between wide and narrow viewing angle modes. The specific third preset time can be set according to the actual situation to provide users with a better user experience.

This embodiment also provides a display device with switchable wide and narrow viewing angles, and the display device is controlled using the control method described above.

The display device includes a display panel 100 capable of switching between wide and narrow viewing angles, and a circuit board 300 for controlling the display panel 100. An action sensor 200 is provided on the display panel 100 or/and the circuit board 300, and the action sensor 200 is used to acquire the action information of the user. Specifically, the action sensor 200 will acquire the action information of the user and transmit it to the circuit board 300. The circuit board 300 processes and analyzes the action information. When the action information is matched with the stored action, the circuit board 300 sends a wide and narrow viewing angle switching signal and controls switching between wide and narrow viewing angle modes.

The difference between the display device with switchable wide and narrow viewing angles in this embodiment and the display device in the first embodiment (FIGS. 1 to 4 and FIGS. 9 to 16) is that in this embodiment, the action sensor 200 is an image sensor, because in this embodiment, the facial action information of the user needs to be acquired, and the image sensor can capture the user's image to analyze the facial actions made by the user.

In this embodiment, the display device does not need to set the switching button 320, as the user can make a variety of facial actions, which is sufficient to meet the needs of switching between different wide and narrow viewing angles based on various facial action information.

Those skilled in the art can understand that the remaining structures and working principles of this embodiment are the same as those of the first embodiment, and will not be repeated here.

In this article, the directional words such as up, down, left, right, front, and back are defined based on the position of the structure in the figures and the position between the structures, only for the clarity and convenience to express the technical solution. It should be understood that the use of the directional words should not limit the scope of protection in this application. It should also be understood that the terms "first", "second" and so forth used in this article are only for distinguishing elements and are not intended to limit quantity or order.

The above is only preferred embodiments of the present invention and does not limit the present invention in any form. Although the present invention has been disclosed in preferred embodiments, it is not intended to limit the present invention. Any person skilled in the art can make some changes or modifications within the scope of the technical solution of the present invention using the disclosed technical content. Any simple modifications, equivalent changes, and modifications made to the above embodiments based on the technical solution of the present invention without departing from the technical solution of the present invention shall still fall within the scope of protection of the technical solution of the present invention.

INDUSTRIAL APPLICABILITY

By acquiring the action information of the user and comparing it with the stored action, and then sending a wide and narrow viewing angle switching signal based on the comparison result and controlling the switching between wide and narrow viewing angle modes, therefore, a sensor such as infrared sensor, ultrasonic sensor or image sensor can be directly set to acquire the action information of the user, thus eliminating the need to set additional viewing angle switching buttons on the keyboard or modify the system reuse function keys to control switching between wide and narrow viewing angle modes, to simplify keyboard design and reduce keyboard production costs.

What is claimed is:

1. A control method for controlling a display device to switch between wide and narrow viewing angles, wherein the control method comprises:

acquiring action information of a user;

comparing the action information with a stored action;

when the action information is matched with the stored action, sending a wide and narrow viewing angle switching signal, and controlling switching between wide and narrow viewing angle modes;

wherein the wide and narrow viewing angle modes include a full-wide viewing angle mode, a left-narrow and right-wide viewing angle mode, a left-wide and right-narrow viewing angle mode, and a full-narrow viewing angle mode;

the display device includes a display panel capable of switching between wide and narrow viewing angles, the display panel includes a light adjusting box and an LCD box stacked to each other;

the light adjusting box includes a first substrate, a second substrate arranged opposite to the first substrate, and a first liquid crystal layer located between the first substrate and the second substrate, the first substrate is provided with a viewing angle control electrode on the side facing the first liquid crystal layer, and the second substrate is provided with a first electrode and a second electrode on the side facing the first liquid crystal layer;

the LCD box includes a color film substrate, an array substrate arranged opposite to the color film substrate, and a second liquid crystal layer located between the color film substrate and the array substrate, the array substrate is provided with a common electrode on the side facing the second liquid crystal layer; and by applying different voltages to the common electrode, the viewing control electrode, the first electrode and the second electrode, the display panel is controlled to switch between the full-wide viewing angle mode, the left-narrow and right-wide viewing angle mode, the left-wide and right-narrow viewing angle mode, and the full-narrow viewing angle mode.

2. The control method as claimed in claim 1, wherein the action information is distance information, the stored action is a stored distance, the control method comprises:

monitoring the distance information of an object from the display panel;

comparing the distance information with the stored distance;

when the distance information is less than the stored distance, sending a wide and narrow viewing angle switching signal, and controlling switching between wide and narrow viewing angle modes.

3. The control method as claimed in claim 2, wherein the control method further comprises:

monitoring a first duration at which the distance information is less than the stored distance;

when the first duration is greater than a first preset time, sending a wide and narrow viewing angle switching signal, and controlling switching between wide and narrow viewing angle modes.

4. The control method as claimed in claim 2, wherein the control method comprises:

after the distance information is detected to be less than the stored distance, and thereafter the distance information is detected to be greater than or equal to the stored distance, it is recorded as a triggering action and the wide and narrow viewing angle switching signal is sent.

5. The control method as claimed in claim 1, wherein the action information is gesture information, the stored action is a stored gesture action, the control method comprises:

acquiring the gesture information of the user;

comparing the gesture information with the stored gesture action;

when the gesture information is matched with the stored gesture action, sending a wide and narrow viewing angle switching signal, and controlling switching between wide and narrow viewing angle modes.

6. The control method as claimed in claim 5, wherein in order for determining that the gesture information is matched with the stored gesture action, the similarity between the gesture information and the stored gesture action is required to be greater than 90%.

7. The control method as claimed in claim 5, wherein the control method further comprises:

monitoring a second duration of the gesture information;

when the second duration is greater than a second preset time, sending a wide and narrow viewing angle switching signal, and controlling switching between wide and narrow viewing angle modes.

8. The control method as claimed in claim 1, wherein the action information is facial action information, the stored action is a stored facial action, the control method comprises:

acquiring the facial action information of the user;

comparing the facial action information with the stored facial action;

when the facial action information is matched with the stored facial action, sending a wide and narrow viewing angle switching signal, and controlling switching between wide and narrow viewing angle modes.

9. The control method as claimed in claim 8, wherein the control method further comprises:

monitoring a third duration of the facial action information;

when the third duration is greater than a third preset time, sending a wide and narrow viewing angle switching signal, and controlling switching between wide and narrow viewing angle modes.

10. The control method as claimed in claim 1, wherein the wide and narrow viewing angle switching signal is a cyclic switching signal, and the cyclic switching signal is used to control the wide and narrow viewing angle modes to be switched cyclically.

11. The control method as claimed in claim 1, wherein the wide and narrow viewing angle switching signal is a reset switching signal, and the reset switching signal is used to control the wide and narrow viewing angle modes to be switched to an initial viewing angle mode.

12. A display device with switchable wide and narrow viewing angles, wherein the display device is controlled by the control method as claimed in claim 1, the display device comprises the display panel capable of switching between wide and narrow viewing angles and a circuit board for controlling the display panel, an action sensor is provided on the display panel or/and the circuit board, the action sensor is used to acquire the action information of the user.

13. The display device as claimed in claim 12, wherein the display panel comprises a display area and a non-display area located around the display area, and the action sensor is located on a glass substrate of the non-display area.

14. The display device as claimed in claim 12, wherein a processor is provided on the circuit board, both the action sensor and the display panel are electrically connected to the processor, the processor controls the display panel to switch between wide and narrow viewing angle modes based on the action information.

15. The display device as claimed in claim 12, wherein the action sensor is an infrared sensor, an ultrasonic sensor, or an image sensor.

* * * * *